US005475356A

United States Patent [19]

Kasahara

[11] Patent Number: 5,475,356

[45] Date of Patent: Dec. 12, 1995

[54] GAS-TUBE ARRESTER

[75] Inventor: Masataka Kasahara, Nagano, Japan

[73] Assignee: Shinko Electric Industries Co., Ltd., Nagano, Japan

[21] Appl. No.: 253,139

[22] Filed: Jun. 2, 1994

[30] Foreign Application Priority Data

Jun. 3, 1993 [JP] Japan .................................... 5-133203

[51] Int. Cl.$^6$ ............................. H01H 39/00; H02H 1/00

[52] U.S. Cl. ............................... 337/31; 337/30; 361/119; 361/124; 361/129

[58] Field of Search ................................. 337/28, 29, 30, 337/31, 32, 33, 34; 361/117, 119, 120, 124, 125, 129, 130, 54

[56] References Cited

U.S. PATENT DOCUMENTS

| | | | |
|---|---|---|---|
| 3,975,664 | 8/1976 | Baumbach | 337/32 |
| 4,062,054 | 12/1977 | Simokat | 361/119 |
| 4,212,047 | 7/1980 | Napiorkowski | 361/124 |
| 4,502,087 | 2/1985 | Huvet | 361/119 |
| 4,649,456 | 3/1987 | De Luca | 361/119 |
| 4,912,592 | 3/1990 | Flindall | 361/120 |
| 4,984,125 | 1/1991 | Uwano | 361/124 |
| 5,027,100 | 6/1991 | Neuwirth | 337/32 |
| 5,248,953 | 9/1993 | Honl | 337/32 |
| 5,282,109 | 1/1994 | Smith | 361/119 |
| 5,313,183 | 5/1994 | Kasahara | 337/32 |
| 5,388,023 | 2/1995 | Boy | 361/129 |

FOREIGN PATENT DOCUMENTS

| | | | |
|---|---|---|---|
| 0017337 | 3/1979 | European Pat. Off. | 361/119 |
| 2951467 | 7/1981 | Germany | 361/120 |
| 5-299153 | 11/1993 | Japan | 361/120 |

*Primary Examiner*—Leo P. Picard
*Assistant Examiner*—Stephen T. Ryan
*Attorney, Agent, or Firm*—Staas & Halsey

[57] ABSTRACT

A gas-tube arrester includes an arrester body in which an inert gas is contained, and first and second electrodes face each other separated by an insulator. An insulating, heat-resistant film is in contact with the first electrode and has a plurality of small holes. A low-melting point metal plate layered on the insulating film has a melting point lower than a decomposition or softening temperature of the insulating film. A conductive leaf spring electrically connected to the second electrode presses the low-melting point metal plate toward the insulating film, so that, when a high voltage is applied between the first and second electrodes, an electrical discharge occurs between the first and second electrodes through the small holes of the insulating films. The leaf spring has an extend portion bent toward the first electrode, so that, if the low-melting point metal plate is melted by heat from the arrester body, the melted metal will electrically connect the extended portion of the leaf spring to the first electrode.

16 Claims, 6 Drawing Sheets

GAS-TUBE ARRESTER

BACKGROUND OF THE INVENTION

1. Field of the Invention

The present invention relates to a gas-tube arrester, and more particularly, to a gas-tube arrester, in which line electrodes and an earth electrode are facing each other with insulators interposed, for protecting communication equipment from lightning or other external electrical surges.

2. Related Art

First of all, some examples of gas-tube arresters known in the prior art will be explained with reference to FIGS. 1 to 5.

An arrester 200 shown in FIG. 1 is mounted on a telephone line or any other communication line to protect the communication equipment from lightning or other external electrical surges. For the arrester 200, as shown in FIG. 2, an arrester body 220, in which argon or other inert gas is gas-tightly contained and line electrodes 206 and an earth electrode 208 are arranged with insulators 210 interposed, is often employed.

If a power supply cable line (100, 200, or 6600 Volts AC) is repeatedly in contact with a telephone line, a high voltage is repeatedly applied to the arrester body 220. Then, an electric discharge continues in the arrester body 220. Eventually, the arrester 200 may be overheated and cause a fire or other disaster.

As a precaution for preventing the arrester 200 from overheating, as shown in FIGS. 1 and 2, an insulating film 204 made of polyester or other thermoplastic resin is placed between the arrester body 220 and a conductive metal leaf spring 202 attached on the outer circumferential surface of the arrester body 220. Thus, a fail-safe mechanism is implemented in the arrester 200.

The metal leaf spring 202 is connected through an opening 205 of the insulating film 204 to the earth electrode 208 by a spot-welding or the like.

Using the arrester 200 having this kind of fail-safe mechanism, when a high voltage is applied repeatedly and an electric discharge continues in the arrester body 220, the arrester 200 will then be overheated. Then, the insulating film 204 made of a thermoplastic resin is melted by the heat of the arrester body 220. Then, the conductive leaf spring 202 is urged to the line electrodes 206 and the earth electrode 208 and connects the line electrodes 206 to the earth electrode 208. Therefore, the earth electrode 208 and line electrodes 206 are electrically shorted. This stops the consecutive electric discharge in the arrester body 220. Consequently, a fire resulting from the overheated arrester 200 can be avoided.

However, in the arrester 200 having only such a fail-safe mechanism as shown in FIGS. 1 and 2, if the argon or other inert gas contained in the arrester body 220 leaks for some reason, even if an external surge is applied to the arrester 200, an electric discharge cannot occur in the arrester body 220. This may cause damage to the communication equipment or some unit of a communication system.

To cope with the foregoing drawback, Japanese Unexamined Patent Publication (Kokai) No. 53-52961 (U.S. Pat. No. 4,212,047) has proposed an arrester having both a vent-safe mechanism and a fail-safe mechanism as shown in FIG. 3.

In the arrester, insulating films 204*a* and 204*b* clamped between line electrodes 206 and a conductive leaf spring 202 electrically coupled to an earth electrode 208 have respective slits 212 and 212.

Owing to the slits 212, as shown in FIG. 4, a space the thickness of the insulating films 204*a* and 204*b* is formed between the conductive leaf spring 202 and the line electrodes 206.

In the gas-tube arrester shown in FIGS. 3 and 4, a fail-safe mechanism and a vent-safe mechanism is implemented.

To be more specific, when an arrester body 220 is heated due to consecutive electric discharge in the arrester body, a fail-safe mechanism operates. That is to say, the insulating films 204*b* made of a thermoplastic resin melt, and a conductive leaf spring 202 electrically connects the line electrodes 206 to an earth electrode 208 to stop the consecutive electric discharges. This prevents occurrence of a fire.

If argon or other inert gas contained in the arrester body 202 leaks, discharge cannot occur in the arrester body. In this case, if an external surge is applied to the arrester, spaces formed with slits 212 on the tops of the line electrodes 206 (FIG. 4) allow an electric discharge between the line electrodes 206 and the conductive leaf spring 202. Thus, a vent-safe mechanism operates.

However, in the arrester shown in FIGS. 3 and 4, the temperature of the arrester body 220 increases due to consecutive discharge. Even if the insulating films 212 melt to bring the conductive leaf spring 202 into contact with the line electrodes 206 and thus the fail-safe mechanism operates, the contact resistance is still high because the conductive leaf spring 202 and the line electrodes 206 are brought into contact merely with a spring force.

A temperature cycle test was conducted in the range from –40° C. to +60° C. to test the gas-tube arresters of this kind, in which a conductive leaf spring 202 comes into contact with line electrodes 206. However, in some samples of arrester, the contact between the conductive leaf spring 202 and line electrodes 206 could not be attained. As a result, it was found that a fail-safe function, which is based on a permanent contact, cannot be guaranteed.

In an effort to guarantee the fail-safe function, the present inventor has tested the arrester shown in FIG. 5 which has been proposed in Japanese Unexamined Patent Publication (Kokai) No. 53-52960 (U.S. Pat. No. 4,062;054).

In the arrester shown in FIG. 5, insulating films 205*a* and 205*b* having heat resistance (insulating film 205*b* is not shown) are used instead of the insulating films 204*a* and 204*b* shown in FIG. 3, and a solder plate 211 for shielding a slit 212 is placed between each of the insulating films 205*a* and 205*b*, and a conductive leaf spring 202.

The fail-safe mechanism of the foregoing arrester operates in such a manner that, when the solder plates 211 are melted by heat developed in the arrester 220, the fused solder connects each of line electrodes 206 to the conductive leaf spring 202. This connection is achieved reliably with the fused solder. Therefore, the fail-safe mechanism can make a reliable connection.

However, in the arrester shown in FIG. 5, the soft solder plates 211 are always pressed by the conductive leaf spring 202. Therefore, portions of the solder plates 202 that are shielding the slits 212 warp gradually toward the line electrodes 206. The solder plates 211 and line electrodes 206 may come into contact unexpectedly. Thus, the arrester cannot assure total reliability.

SUMMARY OF THE INVENTION

An object of the present invention is to provide a gas tube arrester capable of guaranteeing a fail-sale function and eliminating the possibility of an unexpected contact thus providing total reliability.

The present inventor has searched for a solution for achieving the foregoing object. As a result, it has been found that, if the conductive leaf spring having a central portion electrically connected to the earth electrode is provided with extended portions extending along the line electrode faces, solder plates are inserted between the insulating films placed on the line electrodes and the leaf spring, and each of the ends of leaf spring is provided with L-shaped portion bent toward the line electrode face, the clearance between the end of leaf spring and the line electrode face can be adjusted.

The clearance between the end of leaf spring and the line electrode face is the smallest of the gaps between the leaf spring and the line electrode. Thus, when the solder plates are fused, the end of leaf spring can easily come into contact with the line electrode face and an electrical short-circuit can easily be established therebetween, although the insulating film has no slit or the like for deforming the solder plate by the leaf spring.

Therefore, according to the present invention, there is provided a gas tube arrester comprising: an arrester body in which an inert gas is contained, and first and second electrodes facing each other with an insulator therebetween; an insulating, heat-resistant film in contact with said first electrode, said insulating film having a plurality of small holes; a low-melting point metal plate layered on said insulating film, said low-melting point metal plate having a melting point lower than a decomposition or softening temperature of said insulating film; a conductive leaf spring electrically connected to said second electrode and pressing said low-melting point metal plate toward said insulating film, so that said insulating film and said low-melting point metal plate are held between said first electrode and said leaf spring; and said lead spring having an extended portion bent toward said first electrode, in such a manner that a clearance (S) between said extended portion and said first electrode is smaller than a thickness (T) of said low-melting point metal plate, so that, when a high voltage is applied between said first and second electrodes, an electrical discharge occurs between said first electrode and said low-melting point metal plate through said small holes of the insulating films, and on the other hand, if said low-melting point metal plate is melted by heat from said arrester body, the melted metal will allow said extended portion of the leaf spring comes into electrically couple with said first electrode.

According to another aspect of the present invention, there is provided a gas tube arrester comprising: a cylindrical arrester body in which an inert gas is contained, and a pair of first electrodes arranged at respective sides of said arrester body and a second, central electrode arranged therebetween to face said respective first electrodes via a pair of insulators, respectively; a pair of insulating, heat-resistant films being in contact with said first electrodes, respectively, each of said insulating films having a plurality of small holes; a pair low-melting point metal plates layered on said pair of insulating films, respectively, each of said low-melting point metals having a melting point lower than a decomposition or softening temperature of said insulating films; a substantially U-shaped conductive leaf spring electrically connected to said second electrode and symmetrically pressing said low-melting point metals inward to said insulating films, respectively, so that said insulating film and said low-melting point metal plate are held between said first electrode and said leaf spring; and said leaf spring having a pair of extended portions bent toward said pair of first electrodes, respectively, in such a manner that a clearance (S) between said extended portion and said first electrode is smaller than a thickness (T) of said low-melting point metal plate, so that, when a high voltage is applied between said first and second electrodes, an electrical discharge occurs between said first electrode and said low-melting point metal plate through said small holes of the insulating films, and on the other hand, if said low-melting point metal plate is melted by heat from said arrester body, the fused metal will allow said extended portion of the leaf spring to come into electrical contact with said first electrode.

It is preferable that said first electrodes are line electrodes and said second electrode is an earth electrode.

It is also preferable that each of said insulating, heat-resistant films is made of polyimide or the like.

It is also preferable that each of said low-melting point metal plates is made of solder, tin, or any other low-melting point material.

In one embodiment, said extended portion of each said leaf spring has a L-shaped configuration bent toward said first electrode.

In another embodiment, said extended portion of said leaf spring comprises a first L-shaped portion bent toward said first electrode and a second portion further extended in parallel to a contact surface of said first electrode from an end of said first portion.

In the arrester of this invention, when a high voltage is applied between the first and second electrodes, an electrical discharge occurs between the first electrode and the low-melting point metal plate through the small holes of the insulating film, and on the other hand, if the low-melting point metal plate is melted by heat from the arrester body, the fused metal will allow the extended portion of the leaf spring comes into electrical contact with the first electrode.

As a result, the arrester according to the present invention can guarantee a fail-safe function as well as a vent-safe function and provide high reliability.

DESCRIPTION OF THE PREFERRED EMBODIMENTS

The preferred embodiments of the present invention will now be described in detail with reference to FIGS. 6, 7, 8, 9 and 10.

Figure 1:
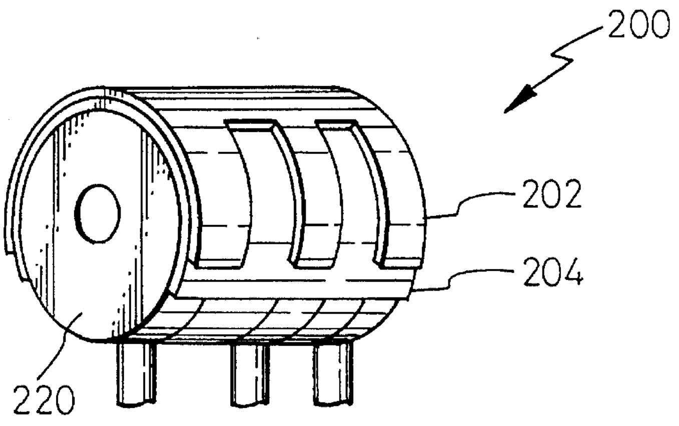
Fig.1 PRIOR ART
FIG. 1 is a perspective view of a conventional gas-tube arrester.
Figure 2:
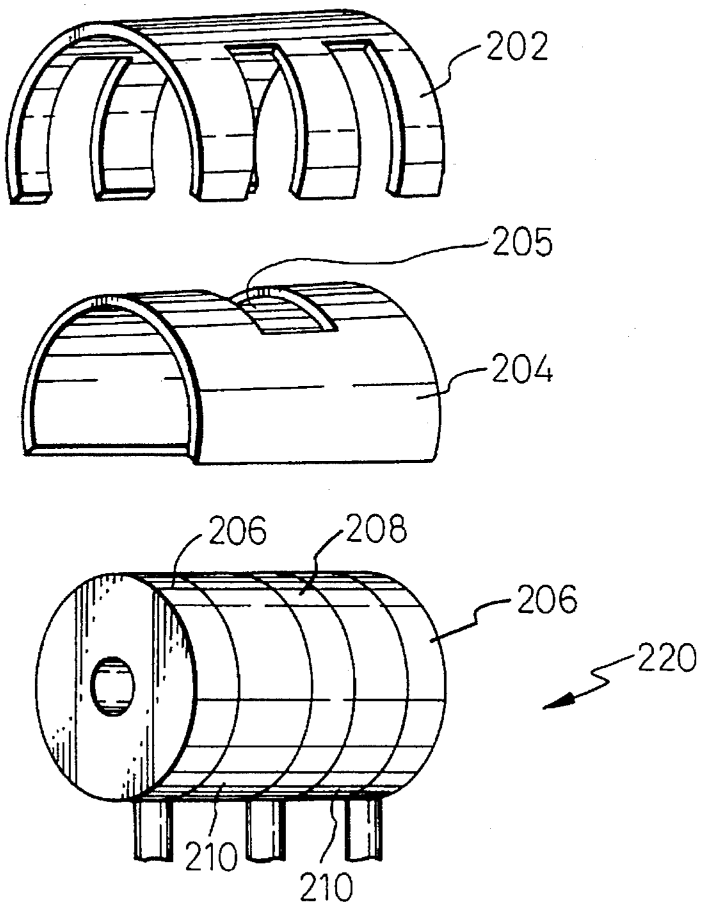
Fig.2 PRIOR ART
FIG. 2 is an assembly diagram of the arrester shown in FIG. 1.
Figure 3:
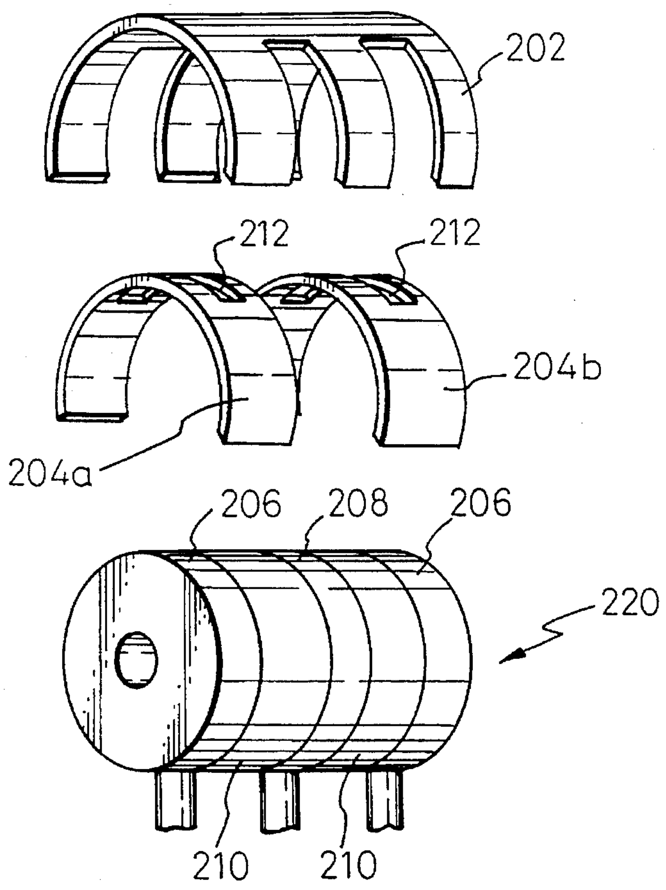
Fig. 3 PRIOR ART
FIG. 3 is an assembly diagram of a gas-tube arrester described in Japanese Unexamined Patent Publication (Kokai) No. 53-52961 (Specification in U.S. Pat. No. 4212047)
Figure 4:
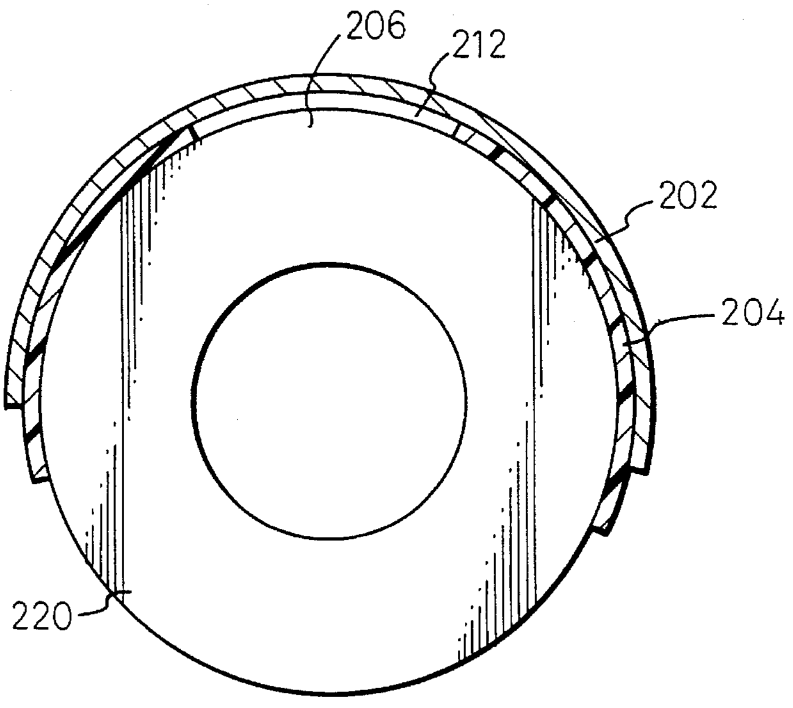
Fig. 4 PRIOR ART
FIG. 4 is a cross-sectional diagram of an arrester in FIG. 3.
Figure 5:
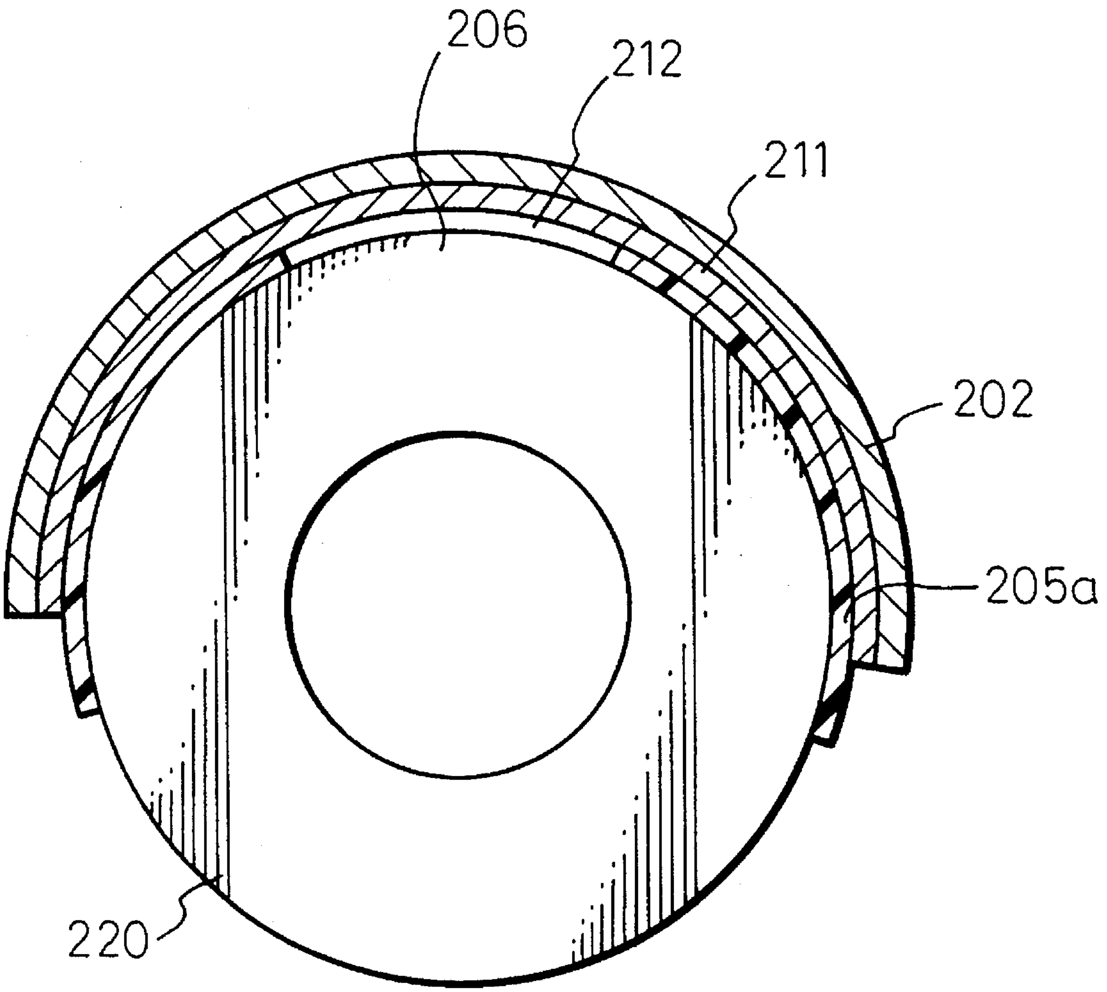
Fig.5 PRIOR ART
FIG. 5 is a cross-sectional diagram showing a known gas-tube arrester described in Japanese Unexamined Patent Publication (Kokai) No. 53-52960 (Specification in U.S. Pat. No. 4062054)
Figure 6:
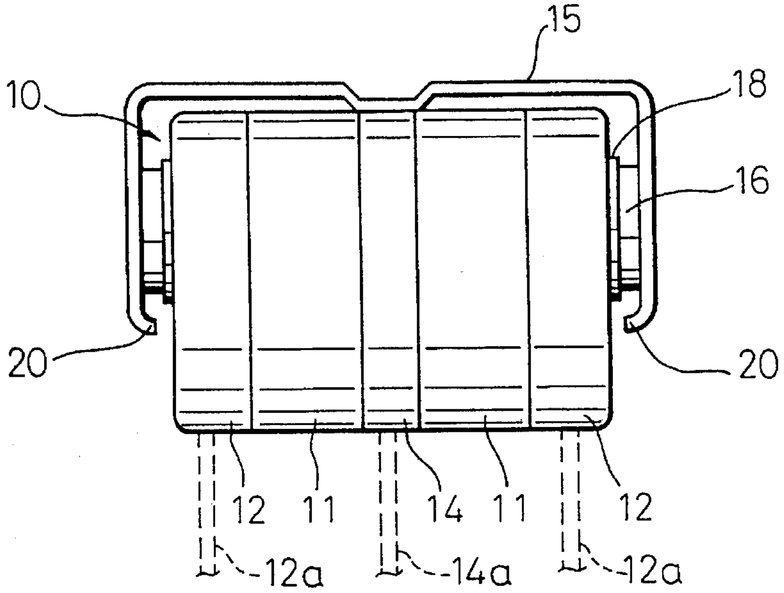
FIG. 6 is a front view of a gas-tube arrester of an embodiment of the present invention.

In a cylindrical arrester body 10 shown in FIG. 6, a pair of line electrodes 12, 12 and a central earth electrode 14 are symmetrically arranged with a pair of insulators 11, 11, respectively interposed therebetween.

The line electrodes 12, 12 and the earth electrode 14 can be connected to the telephone line (not shown) and the ground directly or by means of leads 12*a* and 14*a*, respectively. In the arrester body 10, argon or any other inert gas is gas-tightly contained. If a high voltage is applied between the line electrodes 12 and the earth electrode 14, an electrical discharge will take place in gaps (not shown) (the gap t=0.5 mm to 1.0 mm) therebetween.

To each of the line electrodes 12, 12 on the respective sides of the arrester body 10, an insulating film 18 made of a polyimide resin or a heat-resisting resin and a low-melting point metallic plate 16 made of solder containing silver are attached and clamped by the end of a substantially U-shaped conductive leaf spring 15.

The leaf spring 15 is made of phosphor bronze or stainless steel. The center of the leaf spring 15 is spot-welded to the earth electrode 14. Thus, the leaf spring 15 is firmly secured to the arrester body 10.

The respective ends of the leaf spring 15 are bent to extend along the respective end faces of the arrester body 10, i.e., the faces of line electrodes 12, 12.

Figure 7:
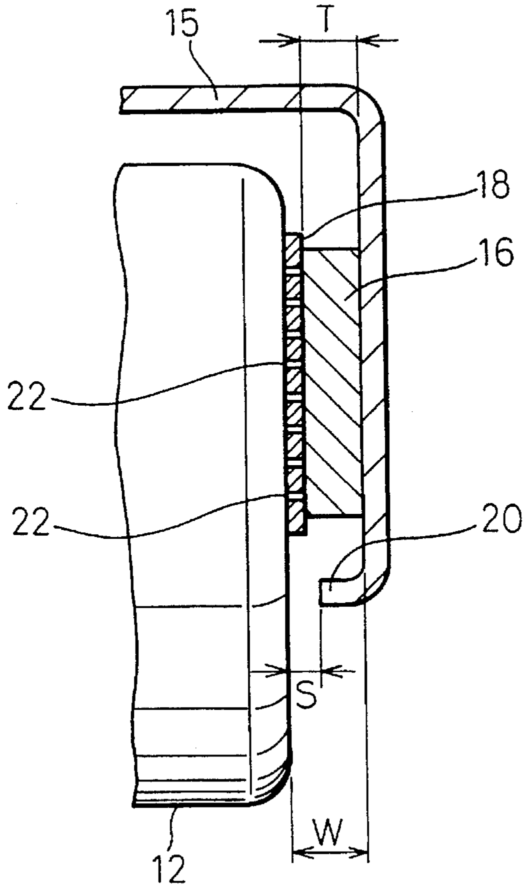
FIG. 7 is a cross-sectional diagram showing a main part of the arrester shown in FIG. 6.

FIG. 7 shows a cross-section of a laminate section made up of the insulating film 18 and a low-melting point metallic plate 16, which are layered on each of the end faces of the arrester body 10, i.e., the faces of line electrodes 12, 12.

As shown in FIG. 7, the low-melting point metallic plate, i.e., solder plate 16 is inserted between the polyimide insulating film 18 directly in contact with the line electrode face 12 and the leaf spring 15. In this embodiment, the thickness of the solder plate 16 is about 0.5 mm.

The polyimide insulating film 18 has a plurality of small holes 22, each hole having a diameter of 0.2 mm.

In this embodiment, the substantially U-shaped leaf spring 15 has respective side portions extending along the line electrode faces 12. Each end of the leaf spring 15 is bent in an L-shaped toward the line electrode 12, so that a gap or clearance S is defined between the line electrode 12 and the end 20 of the leaf spring 15. The clearance S is the smallest gap between the line electrode 12 and the leaf spring 15, i.e., is an air gap for the fail-safe mechanism.

It is preferable that the clearance S is determined to be 0.2 to 0.3 mm by adjusting the bent length of the leaf spring 15 and/or the thickness of the solder plate 16. In this embodiment, the end portion 20 of the leaf spring 15 and the line electrode face 12 are plated with solder.

When the arrester of this embodiment is overheated due to consecutive electric discharges occurring in the arrester body 10, the heat of the arrester body 10 is transferred to the low-melting point metallic plates 16 via the insulating films 18 and it then melts the low-melting point metallic plates 16.

Fused low-melting point metal flowing from the plate 16 reduces the thickness thereof, so that the end 20 of the leaf spring comes into contact with the line electrode face 12. Therefore, the earth electrode 14 and line electrodes 12 are short-circuited to stop consecutive discharge in the arrester body 10. Thus, a fire resulting from-overheating of the arrester body 10 can be effectively avoided.

Since the end portion 20 of the leaf spring 15 and the line electrode face 12 are plated with solder, the connection therebetween can be guaranteed.

In addition, redundant fused low-melting point metal flows due to the spring force of the leaf spring 15 and works as a supplementary coupler for the line electrode face 12 and the leaf spring 15. Therefore, the connection therebetween can be firmly attained and the contact resistance therebetween can be reduced.

If a flux for soldering is coated in advance on the line electrode face 12, the faced metal can easily be guided toward the end portion 20 of leaf spring 12, so that the connection therebetween can be surely attained.

In an example of an arrester, in which solder plates 16 having a thickness (T) of 0.5 mm were placed on the polyimide insulating films 18 and a clearances S of 0.2 mm was defined between the end 20 of leaf spring 15 and line electrode face 12, an electric current of 10A was applied to generate a repeated electric discharge in the arrester body 10. Within 4 to 7 seconds after the start of discharge, the end 20 of leaf spring 15 came into contact with the line electrode face 12 and thus an electrical short-circuit could be obtained between the line electrodes 12 and the earth electrode 14.

In addition, after the connection was made between the line and earth electrodes, it was found that a large amount of current, i.e., 30A, could be applied to the leaf spring 15.

The connections between the leaf spring 1 and line electrodes 12 remain firm by means of the low-melting point metals, even when the arrester body 10 is cooled down after the consecutive discharge stops. The connections withstand a temperature cycle test conducted in the range of –40° C. to +60° C.

In this embodiment, a plurality of small holes 22 are formed on each of the polyimide insulating films 18. The small holes 22 provide a vent-safe function. To be more specific, when argon gas or any other gas contained in the arrester body 10 leaks for some reason and an electric discharge cannot occur in the arrester body 10, if an external surge is applied to the arrester body 10, the small holes 22 each having a diameter of about 0.2 mm induce an electric discharge between the line electrodes 12 and the solder plates 16.

It is, therefore, preferred that each of the polyimide insulating films 18 has a thickness of 50 to 75 μm ensuring the occurrence of electric discharge.

Furthermore, in this embodiment, each of polyimide insulating films 18 has a larger area (larger diameter) than each of the solder plates 16. Therefore, the outer circumferences of the solder plates 16 can be positioned inside those of the insulating films 18. Therefore, the solder plates 16 connected to a leaf spring 15 can be separated from the line electrodes 12 so that an electric discharge will not occur. That is to say, an unstable state, in which an electric discharge may occur between the outer circumferences of the solder plates 16 and the line electrodes 12, will be prevented.

In the gas-tube arrester of this embodiment, an electric discharge occurs only in the spaces of small holes 22 of the insulating film 18. This helps stabilize a discharge start voltage and ensures a vent-safe function.

As described above, in the gas-tube arrester of this embodiment, sections serving as a vent-safe mechanism and a fail-safe mechanism are constituted separately as the small holes 22 and the low-melting point metal (solder) plates 16, respectively. Therefore, various means can be installed to exploit vent-safe and fail-safe functions constantly and reliably.

The arrester of this embodiment can be made as follows. The polyimide insulating films 18 are adhered by any suitable adhesion to the solder plates 16 which are attached in advance to predetermined positions of the conductive leaf spring 15 having L-shaped bent ends 20. Then, the central position of the leaf spring 15 is spot-welded to the earth electrode 14 of the arrester body 10.

When assembling as above, to establish an electrical connection between the solder plate and the leaf spring, the thickness and position of the adhesive should be regulated.

Figure 8:
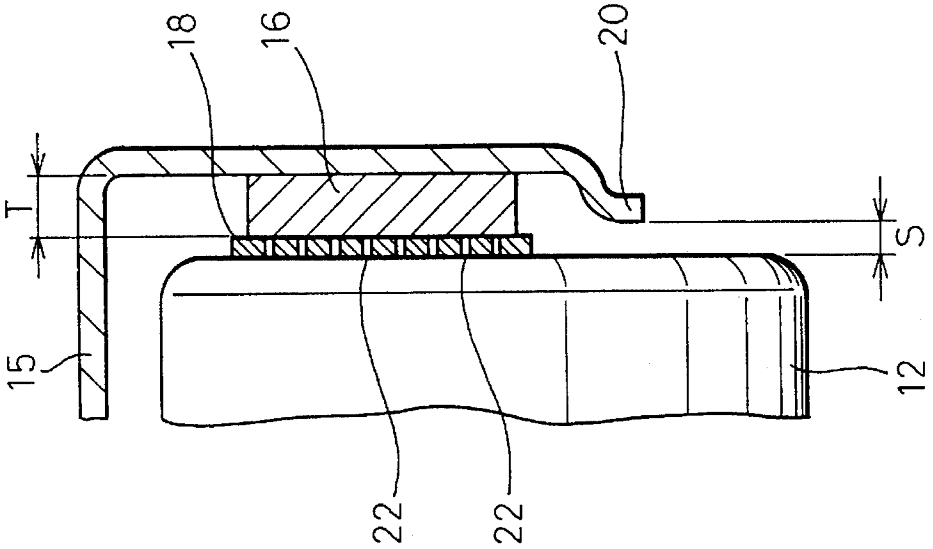
FIG. 8 is a cross-sectional diagram showing a main part of the arrester of another embodiment.

Although, in the embodiment of FIGS. 6 and 7, each of the extended portions 20 of leaf spring 15 is L-shaped, such extended portions 20 of leaf spring 15 may comprise a L-shaped bent portion in the same manner as in the above embodiment and a second portion further bent to extend in parallel to the line electrode face 12 from an end of the L-shaped bent portion, as shown in FIG. 8.

Thus, according to the embodiment of FIG. 8, a contact, i.e., the end 20 of the leaf spring 15 with respect to the line electrode face 12 is parallel to the line electrode face 12 itself. Therefore, in this embodiment, a larger contact area with the leaf spring 15 can be obtained as compared with the embodiment of FIGS. 6 and 7 and, therefore, a more stable fail-safe function can be obtained.

Figure 9:
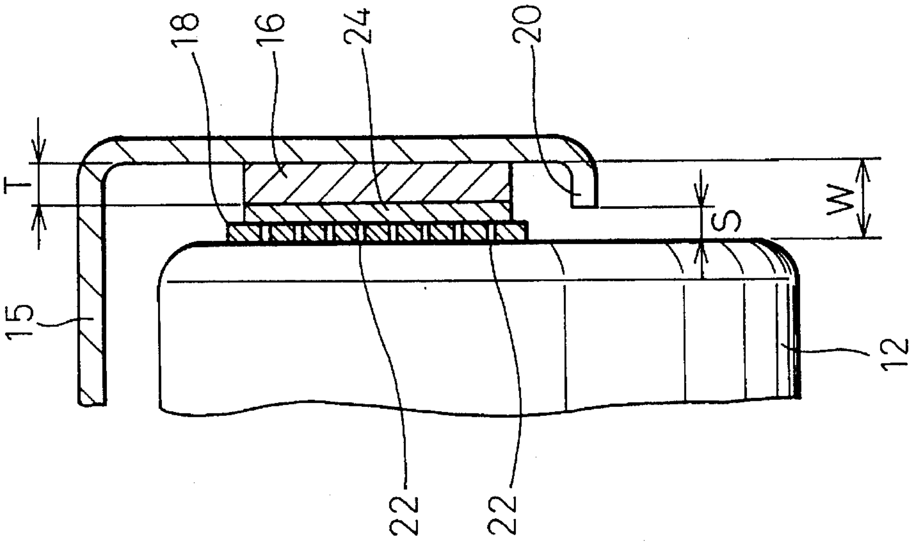
FIG. 9 is a cross-sectional diagram showing still another embodiment similar to FIG. 7.
Figure 10:
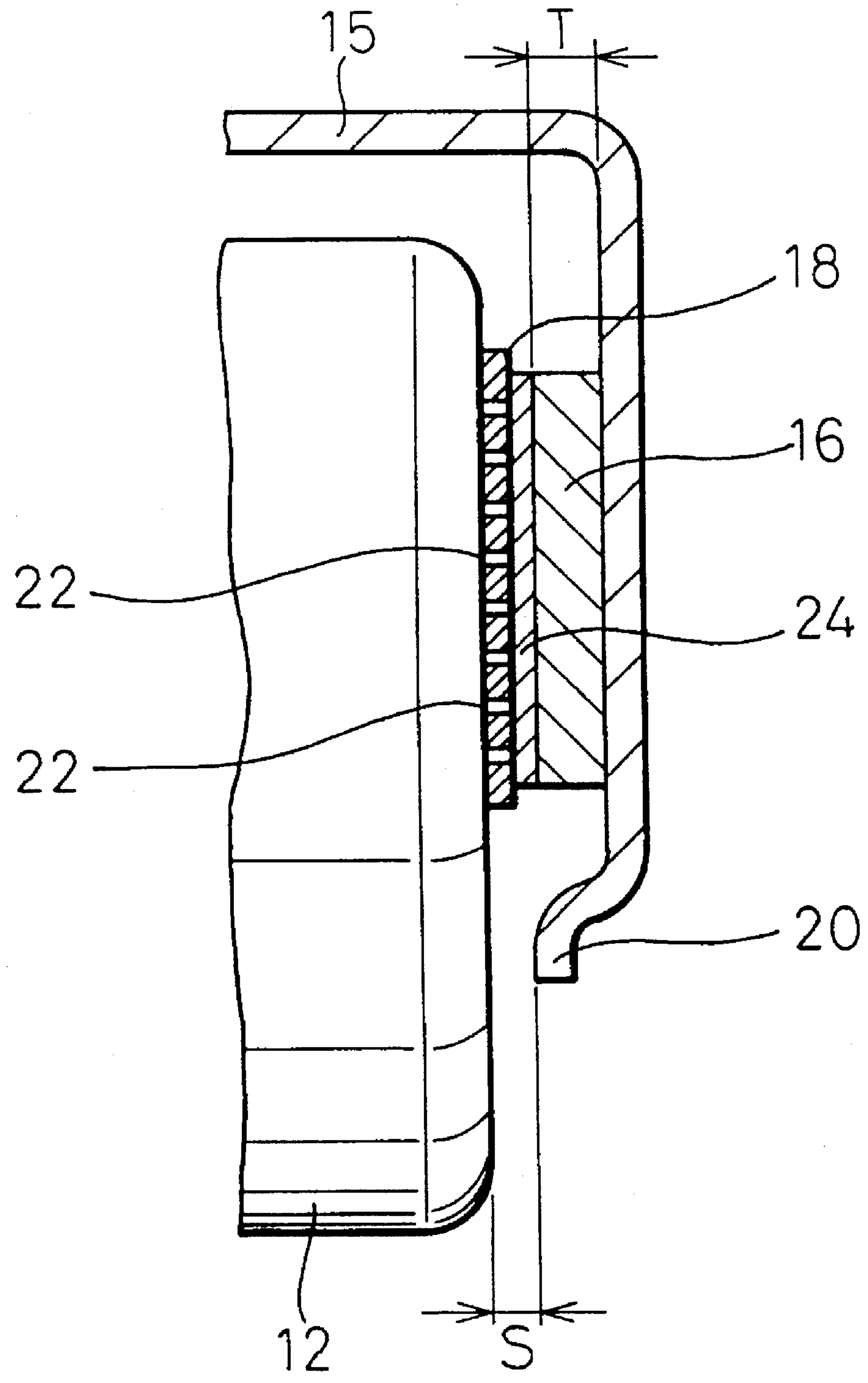
FIG. 10 is a cross-sectional diagram showing further embodiment similar to FIG. 8.

FIG. 9 shows an embodiment of arrester of this invention similar to that of FIG. 7 and FIG. 10 shows another embodiment of arrester of this invention similar to that of FIG. 8. In these embodiment, a metal plate 24 is inserted between the polyimide insulating film 18 and the low-melting point metal plate 16. Such a metal plate 24 can be made of phosphor bronze or copper and has a thickness of about 0.2 mm. It should be noted, however, the clearance S must be smaller than the thickness of the low-melting point metal (solder) plate 16.

As for a polyimide resin made into the insulating films 18 in the above embodiments, an aromatic polyimide resin having a decomposition temperature of 400° C. and a thermal deformation temperature of 360° C. is preferred. Alternatively, any heat-resisting resin whose thermal deformation temperature is higher than that of the low-melting point metal (solder) plates 16 can also be used. The usable heat-resisting insulating resin includes a polyamideimide resin, a polyetherimide resin or the like.

Other heat-resisting material usable for the insulating films 18 includes a mica and other inorganic materials. Insulating films 18 made of an inorganic material are preferable, because they do not deform even at a very high temperature.

For the low-melting point metal plates 16, any low-melting point metals which melt at temperatures lower than the thermal deformation temperature of insulating films 2 can be employed. Metals whose melting points range from 200 to 300° C. are preferred. The preferable low-melting point metal preferably includes solder containing silver.

However, a tin plate having substantially the same melting point as the solder plate 16 can also be used as a low-melting point metal plate 16.

According to the present invention as described above, a fail-safe function can be implemented reliably. This improves the reliability of a gas-tube arrester.

I claim:

1. A gas tube arrester comprising:

an arrester body in which an inert gas is contained, and first and second electrodes facing each other with an insulator therebetween;

an insulating, heat-resistant film in contact with said first electrode, said insulating film having a plurality of small holes;

a low-melting point metal plate layered on said insulating film, said low-melting point metal plate having a melting point lower than a decomposition or softening temperature of said insulating film;

a conductive leaf spring electrically connected to said second electrode and pressing said low-melting point metal plate toward said insulating film, so that said insulating film and said low-melting point metal plate are held between said first electrode and said leaf spring;

said leaf spring having an extended portion bent toward said first electrode, in such a manner that a clearance (S) between said extended portion and said first electrode is smaller than a thickness (T) of said low-melting point metal plate, so that, when a high voltage is applied between said first and second electrodes, an electrical discharge occurs between said first electrode and said low-melting point metal plate through said small holes of the insulating films, and on the other hand, if said low-melting point metal plate is melted by heat from said arrester body, the fused metal will allow said extended portion of the leaf spring to electrically couple with said first electrode.

2. A gas tube arrester as set forth in claim 1, wherein said first electrode is a line electrode and said second electrode is an earth electrode.

3. A gas tube arrester as set forth in claim 1, wherein said insulating, heat-resistant film is made of polyimide or the like.

4. A gas tube arrester as set forth in claim 1, wherein said low-melting point metal plate is made of solder, tin, or any other low-melting point material.

5. A gas tube arrester as set forth in claim 1, wherein said extended portion of said leaf spring has a L-shaped configuration bent toward said first electrode.

6. A gas tube arrester as set forth in claim 1, wherein said extended portion of said leaf spring comprises a first L-shaped portion bent toward said first electrode and a second portion further extended in parallel to a contact surface of said first electrode from an end of said first portion.

7. A gas tube arrester as set forth in claim 1, wherein a thin metal plate is inserted between said insulating film and said low-melting point metal plate.

8. A gas tube arrester as set forth in claim 1, wherein at least an end of the extended portion of the leaf spring and at least a portion of said first electrode facing said end of the leaf spring are plated with solder.

9. A gas tube arrester comprising:

a cylindrical arrester body in which an inert gas is contained, a pair of first electrodes arranged at respective sides of said arrester body, a second, central electrode arranged therebetween to face said respective first electrodes, and a pair of insulators inserted between said first and second electrodes, respectively;

a pair of insulating, heat-resistant films being in contact with said first electrodes, respectively, each of said insulating films having a plurality of small holes;

a pair low-melting point metal plates layered on said pair of insulating films, respectively, each of said low-melting point metals having a melting point lower than the decomposition or softening temperature of said insulating films;

a substantially U-shaped conductive leaf spring electrically connected to said second electrode and symmetrically pressing said low-melting point metals inward to said insulating films, respectively, so that said insulating film and said low-melting point metal plate are held between said first electrode and said leaf spring;

said leaf spring having a pair of extended portions bent toward said pair of first electrodes, respectively, in such a manner that a clearance (S) between said extended portion and said first electrode is smaller than a thickness (T) of said low-melting point metal plate, so that, when a high voltage is applied between said first and second electrodes, an electrical discharge occurs between said first electrode and said low-melting point metal plate through said small holes of the insulating films, and if said low-melting point metal plate is melted by heat from said arrester body, the fused metal will allow said extended portion of the leaf spring to come into electrical contact with said first electrode.

10. A gas tube arrester as set forth in claim 9, wherein said first electrodes are line electrodes and said second electrode is an earth electrode.

11. A gas tube arrester as set forth in claim 9, wherein each of said insulating, heat-resistant film is made of polyimide or the like.

12. A gas tube arrester as set forth in claim 9, wherein each of said low-melting point metal plates is made of solder, tin, or any other low-melting point material.

13. A gas tube arrester as set forth in claim 9, wherein said extended portion of each said leaf spring has a L-shaped configuration bent toward said first electrode.

14. A gas tube arrester as set forth in claim 9, wherein said extended portion of said leaf spring comprises a first L-shaped portion bent toward said first electrode and a second portion further extended in parallel to a contact surface of said first electrode from an end of said first portion.

15. A gas tube arrester as set forth in claim 9, wherein thin metal plates are inserted between said insulating films and said low-melting point metal plates, respectively.

16. A gas tube arrester as set forth in claim 9, wherein each said low-melting point metal plate has a circumference which is smaller than that of each said insulating film, so that each said low-melting point metal plate is located within each said insulating film.

* * * * *